United States Patent
Greene (10) Patent No.: US 8,571,777 B2
(45) Date of Patent: Oct. 29, 2013

(54) INDEPENDENT TRAILER SWAY CONTROLLER

(75) Inventor: Ryan M. Greene, Brighton, MI (US)

(73) Assignee: Robert Bosch GmbH, Stuttgart (DE)

( * ) Notice: Subject to any disclaimer, the term of this patent is extended or adjusted under 35 U.S.C. 154(b) by 309 days.

(21) Appl. No.: 12/856,480

(22) Filed: Aug. 13, 2010

(65) Prior Publication Data
US 2012/0041659 A1    Feb. 16, 2012

(51) Int. Cl.
B60T 7/20    (2006.01)

(52) U.S. Cl.
USPC .............................. 701/70; 701/78

(58) Field of Classification Search
USPC ................. 701/70; 180/14.2, 14.6, 53.1
See application file for complete search history.

(56) References Cited

U.S. PATENT DOCUMENTS

| | | | |
|---|---|---|---|
| 3,810,521 A | 5/1974 | Sparr | |
| 3,819,234 A | 6/1974 | Couchois et al. | |
| 3,948,567 A | 4/1976 | Kasselmann et al. | |
| 4,023,863 A | 5/1977 | Sisson et al. | |
| 4,040,507 A | 8/1977 | Reise | |
| 4,196,936 A | 4/1980 | Snyder | |
| 4,254,998 A | 3/1981 | Marshall et al. | |
| 5,558,350 A | 9/1996 | Kimbrough et al. | |
| 5,620,236 A * | 4/1997 | McGrath et al. | 303/7 |
| 6,499,814 B1 * | 12/2002 | Mixon | 303/124 |
| 6,516,925 B1 * | 2/2003 | Napier et al. | 188/112 A |
| 6,705,684 B1 | 3/2004 | Garvey | |
| 7,447,585 B2 | 11/2008 | Tandy, Jr. et al. | |
| 2002/0038974 A1 * | 4/2002 | Lamke et al. | 303/7 |
| 2002/0195870 A1 * | 12/2002 | Brunson et al. | 303/7 |
| 2007/0102996 A1 * | 5/2007 | Kelly et al. | 303/3 |
| 2008/0169144 A1 * | 7/2008 | DeGrave et al. | 180/165 |
| 2008/0172163 A1 | 7/2008 | Englert et al. | |
| 2009/0045603 A1 | 2/2009 | Huntimer | |
| 2009/0093928 A1 * | 4/2009 | Getman et al. | 701/37 |
| 2009/0198425 A1 | 8/2009 | Englert | |
| 2009/0228182 A1 | 9/2009 | Waldbauer et al. | |
| 2010/0152989 A1 * | 6/2010 | Smith et al. | 701/78 |

OTHER PUBLICATIONS

Etrailer.com, Trailer Wiring Diagrams, 6 pages, retrieved Aug. 12, 2010 from http://www.etrailer.com/faq-wiring.aspx.

* cited by examiner

Primary Examiner — Thomas Tarcza
Assistant Examiner — Garrett Evans
(74) Attorney, Agent, or Firm — Michael Best & Friedrich LLP (57) ABSTRACT

An independent trailer sway controller and method for mitigating trailer sway. The independent trailer sway controller is a modular unit swappable between different trailer types. The independent trailer sway controller includes a trailer length input for receiving length data indicating a length of the trailer and a sway sensor for measuring sway movement of the trailer. The independent trailer sway controller also includes a trailer sway detector module that receives the length data and sway data and determines a level of trailer sway based on the length data and sway data. If the level of trailer sway exceeds the predetermined threshold, a brake controller outputs control signals that activate trailer brakes, which are part of an electric brake system or hydraulic brake system.

19 Claims, 11 Drawing Sheets

INDEPENDENT TRAILER SWAY CONTROLLER

BACKGROUND

The present invention relates to controllers for mitigating trailer sway.

A trailer being towed by a tow vehicle can begin to sway for many reasons including road conditions, weather, traffic conditions, load position, load quantity, and vehicle speed. Excessive trailer sway can cause the tow vehicle to lose control.

SUMMARY

The invention provides, among other things, an independent trailer sway controller mountable on the tongue of a trailer. The independent trailer sway controller includes a trailer length input that receives length data indicating a length of the trailer. The controller also receives output length data. A sway sensor measures sway movement of the trailer and outputs sway data. A trailer sway detector module receives the length data and sway data and determines a level of trailer sway based on the length data and sway data. The trailer sway detection module then determines whether the level of trailer sway exceeds a predetermined threshold and outputs a trailer sway condition signal if the level of trailer sway exceeds the predetermined threshold. A brake controller module receives the trailer sway condition signal and, in response, outputs a brake enable signal received by a trailer braking unit. The brake enable signal causes enabling of a trailer brake to apply braking force to one or more trailer wheels to mitigate trailer sway.

The invention also provides a method of mitigating sway of a trailer with an independent trailer sway controller. The method includes receiving length data indicating the length of the trailer and receiving sway data output from a sway sensor indicating a sway rate of the trailer. The method also includes determining a level of trailer sway based on the length data and the sway data and determining whether the level of trailer sway exceeds a predetermined threshold. If the level of trailer sway exceeds the predetermined threshold, braking control signals or outputs are generated. The signals cause a brake of the trailer to apply braking force, thereby mitigating sway of the trailer.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
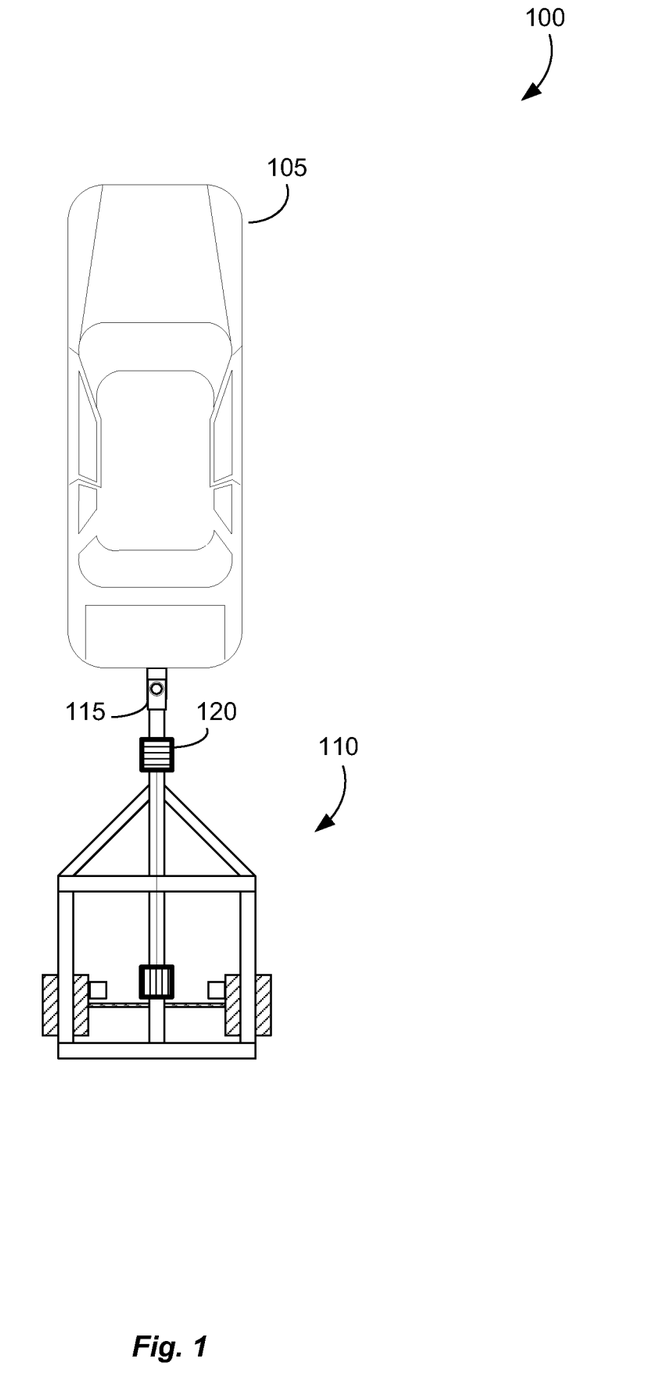
FIG. 1 illustrates a towing system including an independent trailer sway controller according to embodiments of the invention.

FIG. 1 depicts a towing system 100 including a tow vehicle 105 and a trailer 110 that is pulled by the tow vehicle 105. The tow vehicle 105 is coupled to the trailer 110 by a hitching system 115, such as a hitch ball and hitch ball receiver. In some embodiments, other hitching systems are used to couple the tow vehicle 105 to the trailer 110.

Figure 2:
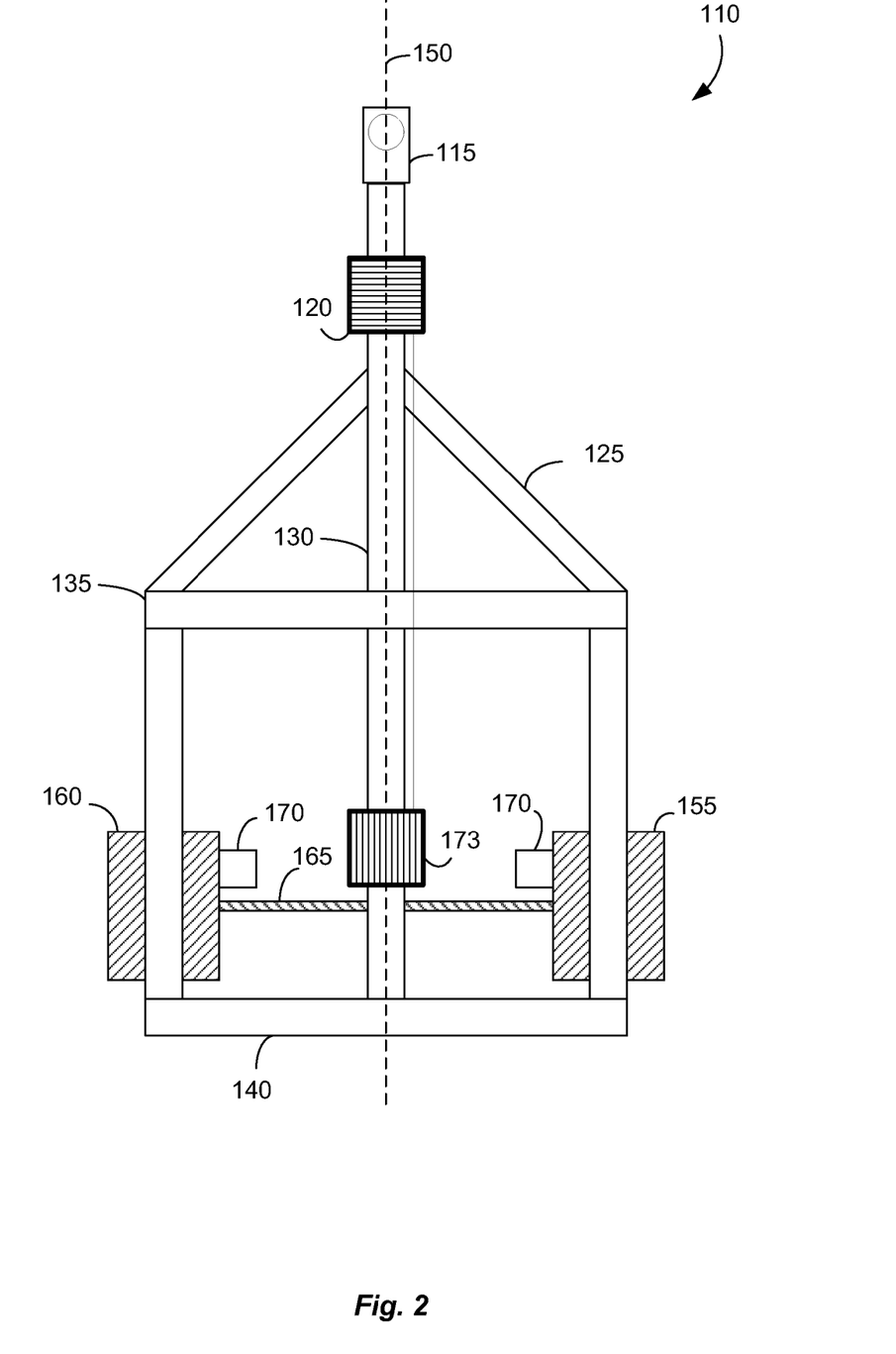
FIG. 2 illustrates the trailer of the towing system including an independent trailer sway controller according to embodiments of the invention.

FIG. 2 depicts the trailer 110 in greater detail. The trailer 110 includes an independent trailer sway controller 120 and a frame 125 with a tongue 130, a front cross beam 135, and a rear cross beam 140. The tongue 130 includes a hitch ball receiver 145 at a first end and extends to the rear cross beam 140. The tongue is located at the approximate midpoint 150 between a right wheel 155 and a left wheel 160 of the trailer 110, also referred to as the longitudinal axis 150 of the trailer. The right wheel 155 and left wheel 160 are joined by an axle 165. Attached to each wheel 155 and 160 are trailer brakes 170 used to supply braking force to the associated wheel. In some embodiments including a hydraulic braking system, a hydraulic braking unit 173 (see, e.g., FIG. 6B) is included on the trailer 110. The trailer brakes 170 are surge-hydraulic brakes, electrically-controlled (non-surge) hydraulic brakes, electrically controlled brakes, or another braking system, each of which includes additional components not depicted in FIG. 2. The independent trailer sway controller 120 is usable with various trailers including multi-axle trailers and trailers of different sizes and is not limited to use with the trailer 110 of FIGS. 1-3c.

Figure 3A:
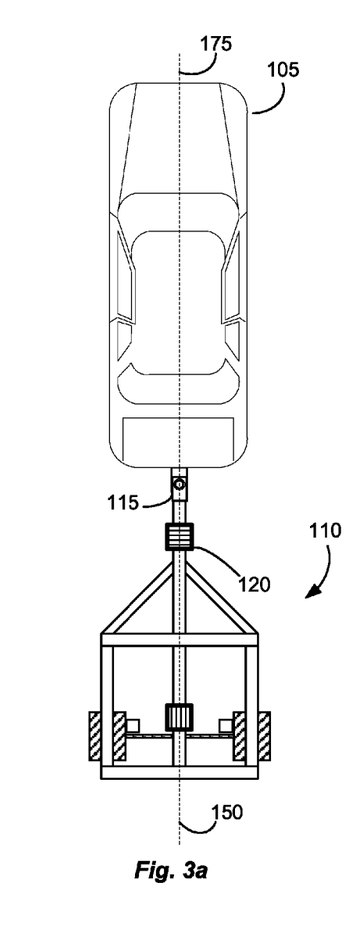
FIGS. 3a-c illustrate the trailer at various sway angles relative to a tow vehicle.
Figure 3B:
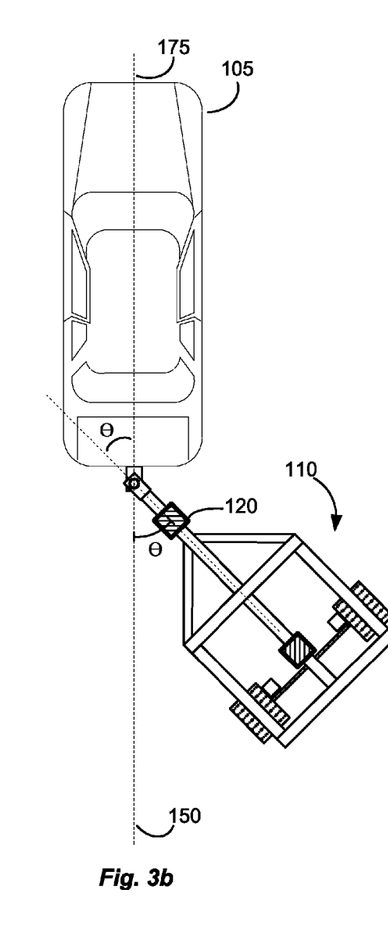
Figure 3C:
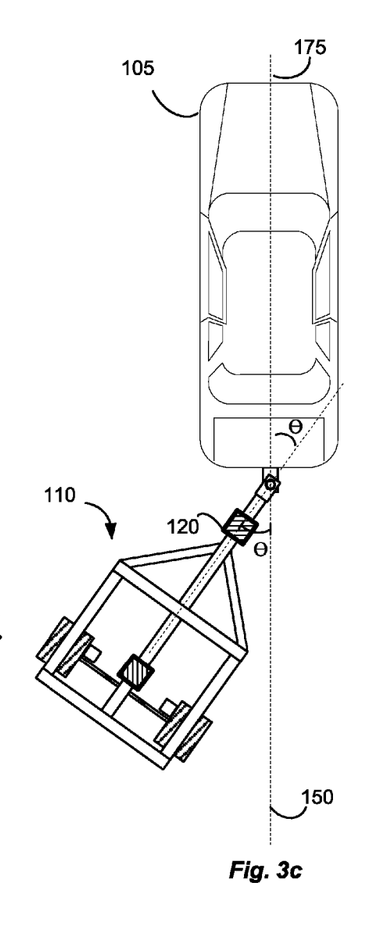

FIGS. 3a-c illustrate sway angles that form between the tow vehicle 105 and trailer 110. The tow vehicle 105 includes a midpoint (or longitudinal axis) 175. In FIG. 3a, the axis 175 of the tow vehicle 105 and the axis 150 of the trailer 110 are in alignment and the sway angle (θ) is zero. The axis 175 and axis 150 are in alignment, for instance, when the tow vehicle 105 and trailer 110 are both traveling in the same direction (e.g., straight ahead). In FIGS. 3b-c, axis 150 and axis 175 are no longer in alignment, for instance, because of trailer sway or turning of the tow vehicle 105. The angle created about the intersection of the axis 150 and axis 175 is the sway angle (θ). The intersection of the axis 150 and axis 175 is at the z-axis, which extends out of the page perpendicular to the plane of the page. In this description, the sway angle (θ) is described as being within +/−180 degrees. In FIG. 3b, the sway angle (θ) is positive (between zero and +180 degrees). In FIG. 3c, the sway angle (θ) is negative (between −180 and zero degrees). In some embodiments, other naming and labeling conventions are used with respect to the sway angle (θ). For instance, the sway angle (θ) may be between zero and 360 degrees. The sway speed is the rate of change of the sway angle (θ). The sway acceleration is the rate of change of the sway speed. The sway oscillation rate is the frequency at which sway speed changes from positive to negative (i.e., the rate at which the trailer sways back and forth). The level of trailer sway or sway rate includes one or more of the sway angle, the sway speed, the sway acceleration, and the sway oscillation rate. In some embodiments, the sway angle, sway speed, and sway acceleration are detected with respect to a z-axis at the estimated or actual center of gravity of the trailer 110, as opposed to the hitching system 115. In such an embodiment, the sway angle, rate, and acceleration are the yaw angle, yaw rate, and yaw acceleration of the trailer 110. In other embodiments, the sway angle, sway speed, and sway acceleration are detected with respect to a z-axis at another location on or near the axis 150.

Figure 4:
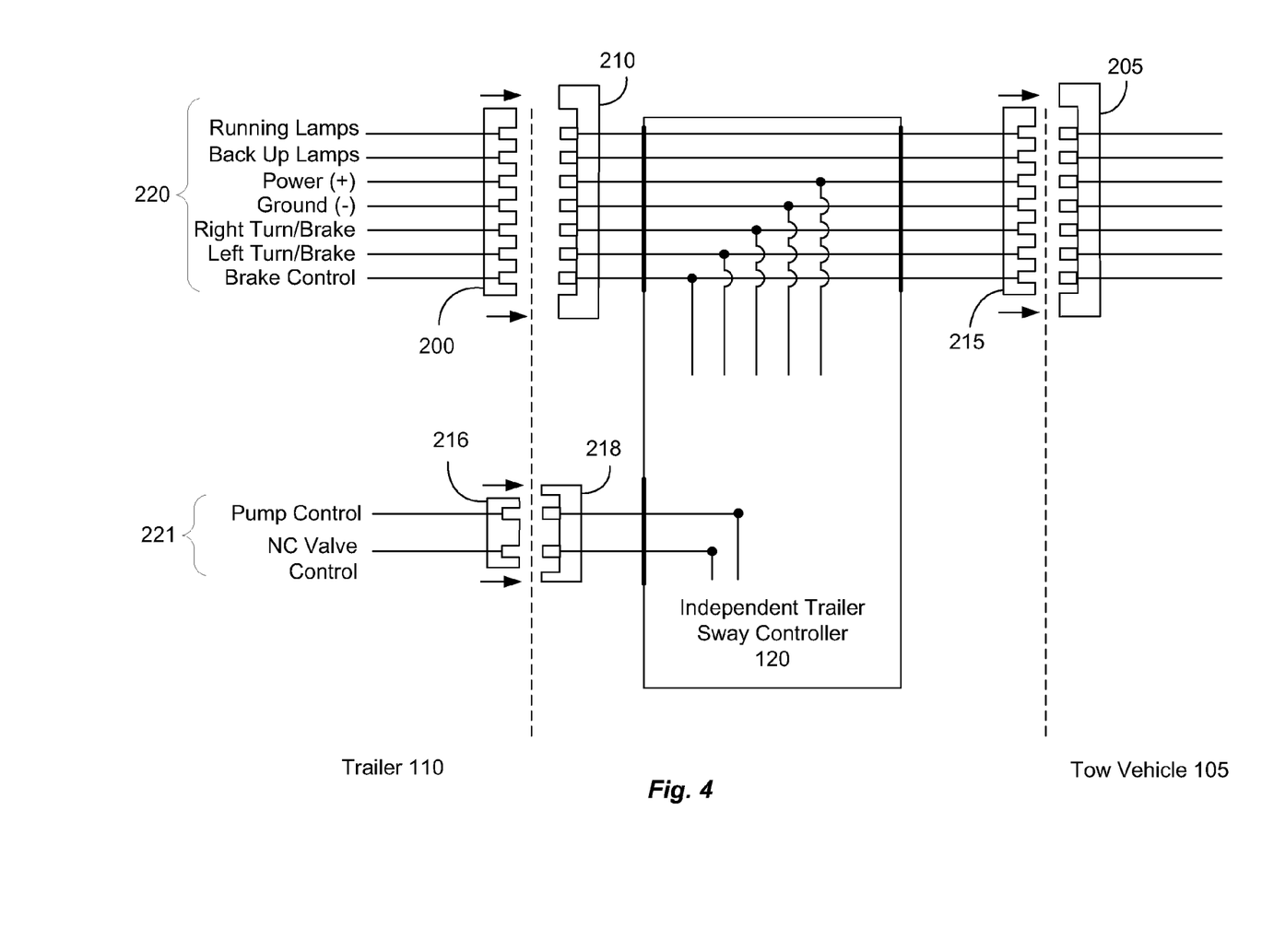
FIG. 4 illustrates connections between a trailer, a tow vehicle, and an independent trailer sway controller according to embodiments of the invention.

As shown in FIG. 4, the independent trailer sway controller 120 is coupled between a trailer plug 200 and tow vehicle receptacle 205 to attach the independent trailer sway controller 120 to the towing system 100. The trailer plug 200 is inserted into a controller receptacle 210 and the tow vehicle receptacle 205 receives a controller plug 215. For trailers with hydraulic surge braking system, a controller receptacle 218 receives a trailer plug 216 to enable the independent trailer sway controller 120 to control the trailer brakes 170. In some embodiments, one or more of the plugs 200, 215, and 216 are receptacles and the receptacles 205, 210, and 218 are plugs. Additionally, in some embodiments, the plugs 200 and 216 are combined into a single plug or receptacle and the receptacle 210 is a plug. The receptacles 205, 210, and 218 and the plugs 200, 215, and 216 are 7-pin trailer connectors (see, e.g., FIG. 10). In some embodiments, different connectors are used.

FIG. 4 also illustrates exemplary signal lines 220 between the tow vehicle 105 and the trailer 110, including: running lamps, back up lamps, power, ground, right turn/brake light, left turn/brake light, and a brake control line. When plugs 200 and 215 are coupled to receptacles 210 and 205, the independent trailer sway controller 120 is coupled to one or more of the signal lines 220. The independent trailer sway controller 120 is able to drive control signals on the signal lines 220, monitor signals sent on the signal lines 220, and receive power via the signal lines 220. In some embodiments, the power, ground, right turn/brake, left turn/brake, and brake control signals are not passed through with the independent trailer sway controller 120coupled to monitor and drive the signals. Rather, these signals from the tow vehicle 105 are received by the independent trailer sway controller 120 at inputs separate and independent from outputs to the trailer 110. Thus, the independent trailer sway controller 120 is an intermediary between the trailer 110 and the tow vehicle 105, and the tow vehicle 105 is not operable to directly control the trailer 110. Rather, the independent trailer sway controller 120 outputs along signal lines 220 to the trailer 110 either in response to signals from the tow vehicle 105 or on its own volition. Some signals, such as the signals for controlling trailer running lamps and back up lamps, are passed-through in some embodiments without monitoring or controlling by the independent trailer sway controller 120. Hydraulic brake controls 221 are driven by the independent trailer sway controller 120 and sent to the hydraulic braking system via plug 216 and receptacle 218.

In a surge-hydraulic braking system, the (hydraulic) trailer brakes 170 are enabled without control signals from the tow vehicle 105. When the tow vehicle 105 slows, the force of the trailer 110 against the slowing tow vehicle 105 is redirected to cause an increase in pressure in the hydraulic brake lines, which enables the trailer brakes 170. Thus, the trailer brakes 170 are controlled by mechanical forces rather than electric signals between the tow vehicle 105 and trailer 110. However, in non-surge hydraulic braking systems where the trailer hydraulic brakes are controlled by electrical signals from the tow vehicle, additional connections are provided between the tow vehicle and independent trailer sway controller 120.

When the towing system 100 is operated without the independent trailer sway controller 120, the trailer plug 200 is inserted directly into the tow vehicle receptacle 205 to couple the signal lines therebetween. When coupled, the tow vehicle 105 is operable to provide power and ground to the trailer 110 via power and ground lines, enable and disable the brake/turn signal lights via the right turn/brake and left turn/brake control lines, and enable and disable the brakes via the brake control line. Although each of the signal lines 220 are described as an individual line, each of the signal lines 220 may include one or more electrical couplings (e.g., wires), optical couplings, or other means to transmit one or more control signal. Furthermore, in some embodiments, additional signal lines are coupled between the trailer and the tow vehicle.

The independent trailer sway controller 120 is a modular unit that is selectively attachable to the trailer 110 and other trailers, for instance, post-manufacture. As will be described in greater detail below, the independent trailer sway controller 120 is configurable to adapt to various sizes of trailers, various trailer loads, and various trailer braking systems. Thus, a user is able to swap the independent trailer sway controller between multiple trailers as needed. For trailers 110 including surge-hydraulic braking systems, the hydraulic braking unit 173 is also added post-manufacture to the trailer 110 so that the independent trailer sway controller 120 is operable to control the trailer brakes 170.

Figure 5:
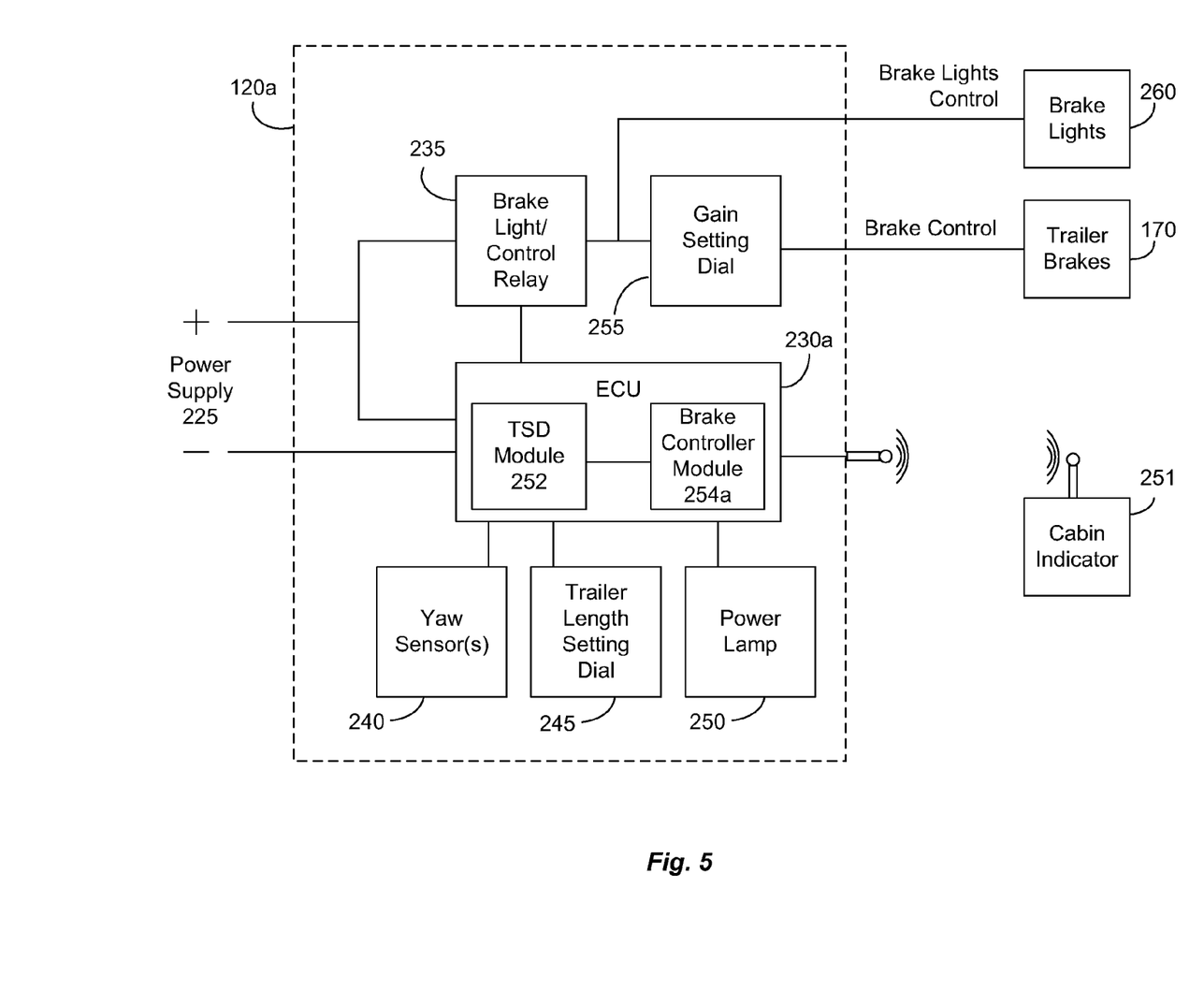
FIG. 5 illustrates an independent trailer sway controller for use with a trailer including an electric braking system.
Figure 6A:
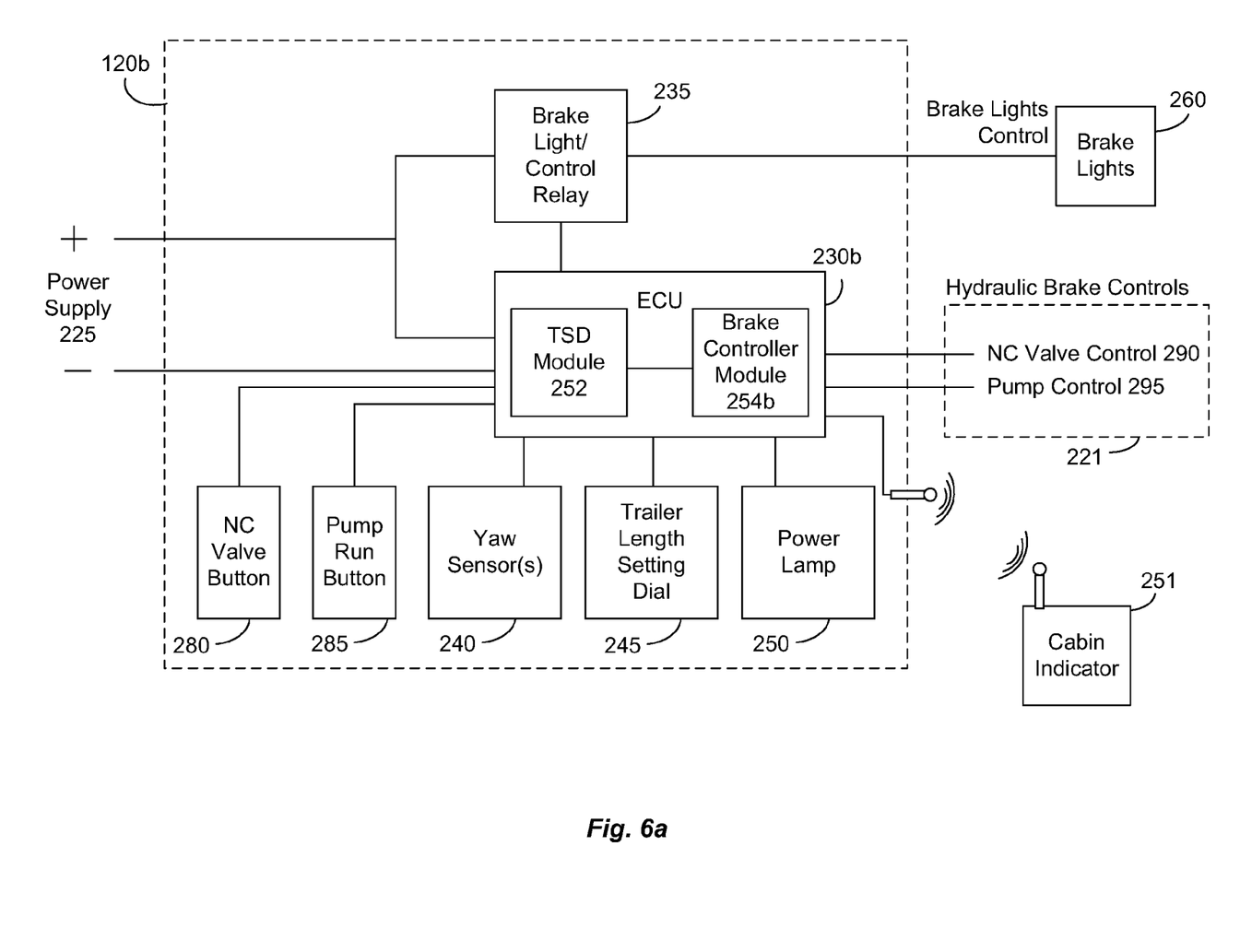
FIG. 6a illustrates an independent trailer sway controller for use with a trailer including a hydraulic braking system.
Figure 7:
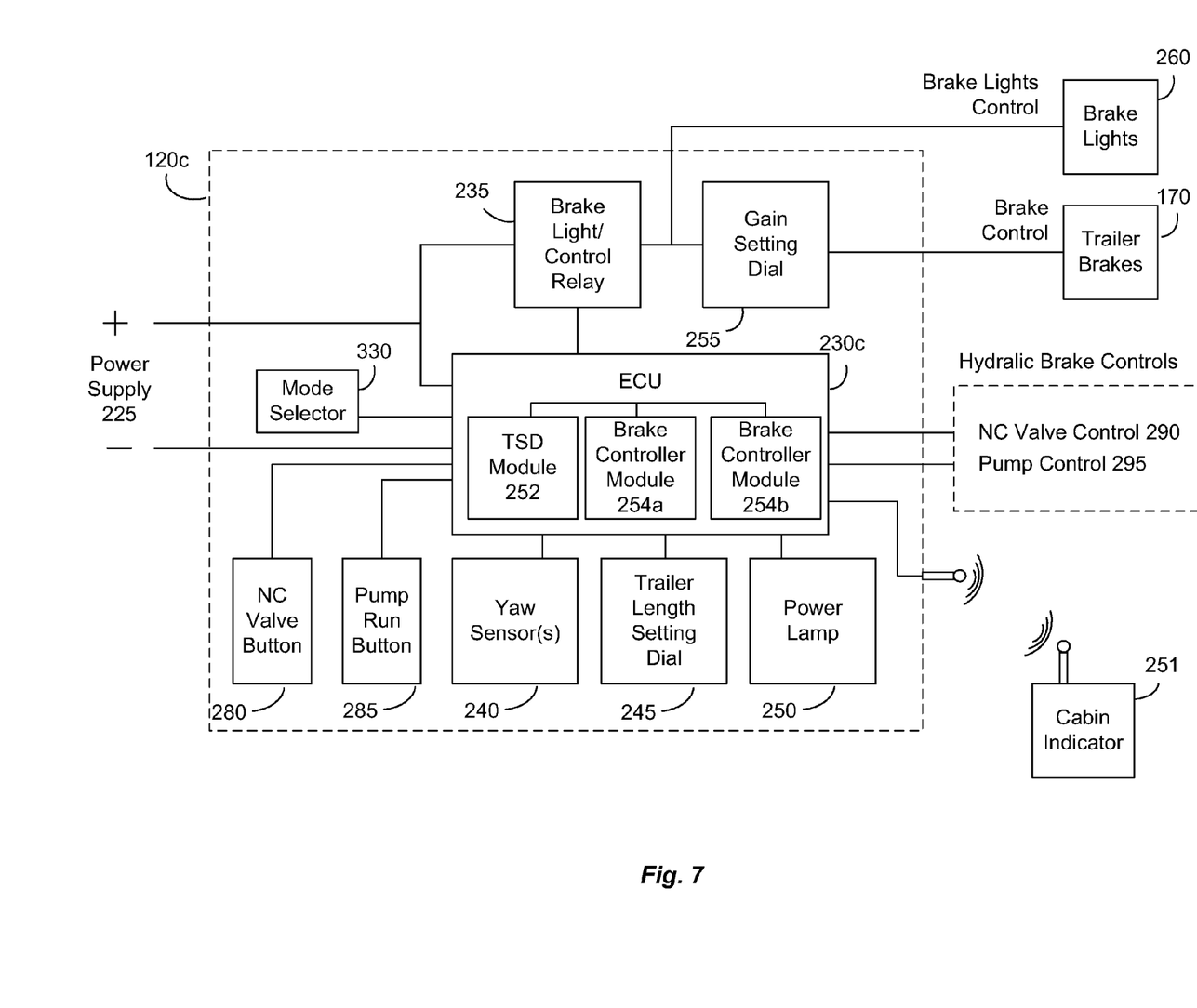
FIG. 7 illustrates an independent trailer sway controller for use with a trailer including a hydraulic or an electric braking system.

FIGS. 5, 6a, and 7 depict independent trailer sway controller 120a, 120b, and 120c, respectively, each being an example of the independent trailer sway controller 120. FIG. 5 depicts the independent trailer controller 120a, which is used with a trailer 110 that includes an electric trailer brake system. The controller 120a receives power at the power supply input 225 from the trailer battery control line of the signal lines 220, power and ground lines of the signal lines 220, or a local power source (e.g., a battery of the independent trailer sway controller 120). The power supply input 225 is coupled to an electronic control unit (ECU) 230a and the brake light/control relay 235. An ECU, such as ECU 230a, is a microcontroller that includes (or is connected to) memory such as RAM and ROM and executes software that can be stored in the RAM (particularly during execution), the ROM (on a generally permanent basis), or another non-transitory computer readable medium such as other memory or disc. If necessary, the microcontroller can be connected to such memory or a disc drive to read such software. The ECU 230a may be implemented as a microprocessor or other programmable device (e.g., a field programmable gate array (FPGA), an application specific integrated circuit (ASIC), or the like) with suitable memory and I/O devices.

The ECU 230a is coupled to a sway sensor 240, a trailer length setting dial 245, a power lamp 250, and the brake light/control relay 235 and communicates with a cabin indicator 251 wirelessly. The sway sensor 240 measures sway rate and outputs the measured sway rate (sway data) to the ECU 230a as a digital or analog signal. The measured sway data is, for instance, output as a digital signal representing a value from zero to sixty-four, where the higher the output value the larger the sway speed detected. The ECU 230a is operable to derive sway oscillation, sway acceleration based on the sway speed. In some embodiments, the sway sensor 240 performs the derivations and provides the sway oscillation rate and sway acceleration to the ECU 230*a* in addition to the sway speed. In some embodiments, more than one sway sensor 240 is provided to provide redundancy in case of failure or error in one of the sway sensors 240. In some embodiments, the sway sensor 240 is a yaw sensor that measures and outputs yaw rate data.

The trailer length setting dial 245 outputs an indication of a length of the trailer 110. The trailer length setting dial 245 is on the outside of a housing 247 of the independent trailer sway controller 120 such that a user (e.g., the driver of the tow vehicle) can adjust the length setting. The housing 247 is depicted in greater detail in FIG. 8 and described below. For instance, the trailer length setting dial 245 includes eleven settings between ten feet and twenty feet, where rotating the dial varies the setting one foot at a time. Of course, various length ranges are possible and various precision levels are also possible in other embodiments of the invention. Furthermore, other input devices, such as a sliding tab, a sliding lever, push button inputs, etc. are used in place of the dial 245 to input the length setting either alone or with an analog or digital display. The length setting of the trailer length setting dial 245 is output to the ECU 230*a* and used by the ECU 230*a* to calculate whether a trailer sway situation exists that requires corrective action (e.g., application of the brakes, warning to the driver, etc.). The length of the trailer is not necessarily the total length of the trailer from hitch to the far back end (e.g., from hitching system 115 to rear cross beam 140 or to a bumper (not shown). In some embodiments, the trailer length setting dial 245 is used to output an indication of the length from the hitch to the center of gravity, the hitch to the front axel or rear axel, the center of gravity of the trailer to one of the trailer axels, etc., which are all lengths of the trailer 110.

The power lamp 250 is one or more lights on the outside housing of the independent trailer sway controller 120*a* housing. The power lamp 250 is used to indicate that the independent trailer sway controller 120*a* is operating correctly (e.g., with a green light), has detected trailer sway (e.g., with a blinking light), or is operating incorrectly (e.g., with a red light). In some embodiments, a single bulb with different blinking patterns is used to indicate correct operation, faulty operation, and trailer sway detection. Thus, the power lamp 250 provides a visual indication of the operation of the independent trailer sway controller 120*a*.

The cabin indicator 251 is an indicator for the driver of the tow vehicle 105 to indicate the status of the independent trailer sway controller 120*a*. In some embodiments, the cabin indicator 251 is a light-emitting diode (LED) providing visual status indications such as detection and mitigation of trailer sway conditions. In some embodiments, the cabin indicator 251 mirrors the indications provided by the power lamp 250 described above. In some embodiments, the cabin indicator 251 provides an audio indication either in addition to or in place of the visual indication. The cabin indicator 251 is depicted as communicating wireless with the ECU 230*a* connections. In some embodiments, however, a wired connection is used between the independent trailer sway controller 120*a* and the cabin indicator 251.

In the electric trailer brake system, the independent trailer sway controller 120*a* outputs a brake signal to control enabling or disabling of the trailer brakes 170 in response to determining whether trailer sway condition exists. The ECU 230*a* includes a trailer sway detection (TSD) module 252 and a brake controller module 254*a*. The TSD module 252 receives the sway data from the sway sensor 240 and the length setting from the trailer length setting dial 245. The TSD module 252 determines the level of trailer sway based on the sway data and the length setting. The TSD module compares the determined level of trailer sway with a predetermined level to determine whether excessive trailer sway is occurring (i.e., whether a trailer sway condition exists). If a trailer sway condition exists, the TSD module 252 sends a message or signal to the brake controller module 254*a* indicating that the trailer sway condition is present.

In response, the brake controller module 254*a* generates a brake enable signal and provides it to the brake light/control relay 235. The brake light/control relay 235 is normally open. When the brake light/control relay 235 receives the brake enable signal, the relay closes and provides the power input from the power supply input 225 to a gain setting dial 255 and to trailer brake lights 260. Depending on the current setting of the gain setting dial 255 applies a gain to either increase the voltage level output to the trailer brakes 170, reduce the voltage level output to the trailer brakes 170, or apply no gain and forward the voltage level as-is to the trailer brakes 170.

Figure 8:
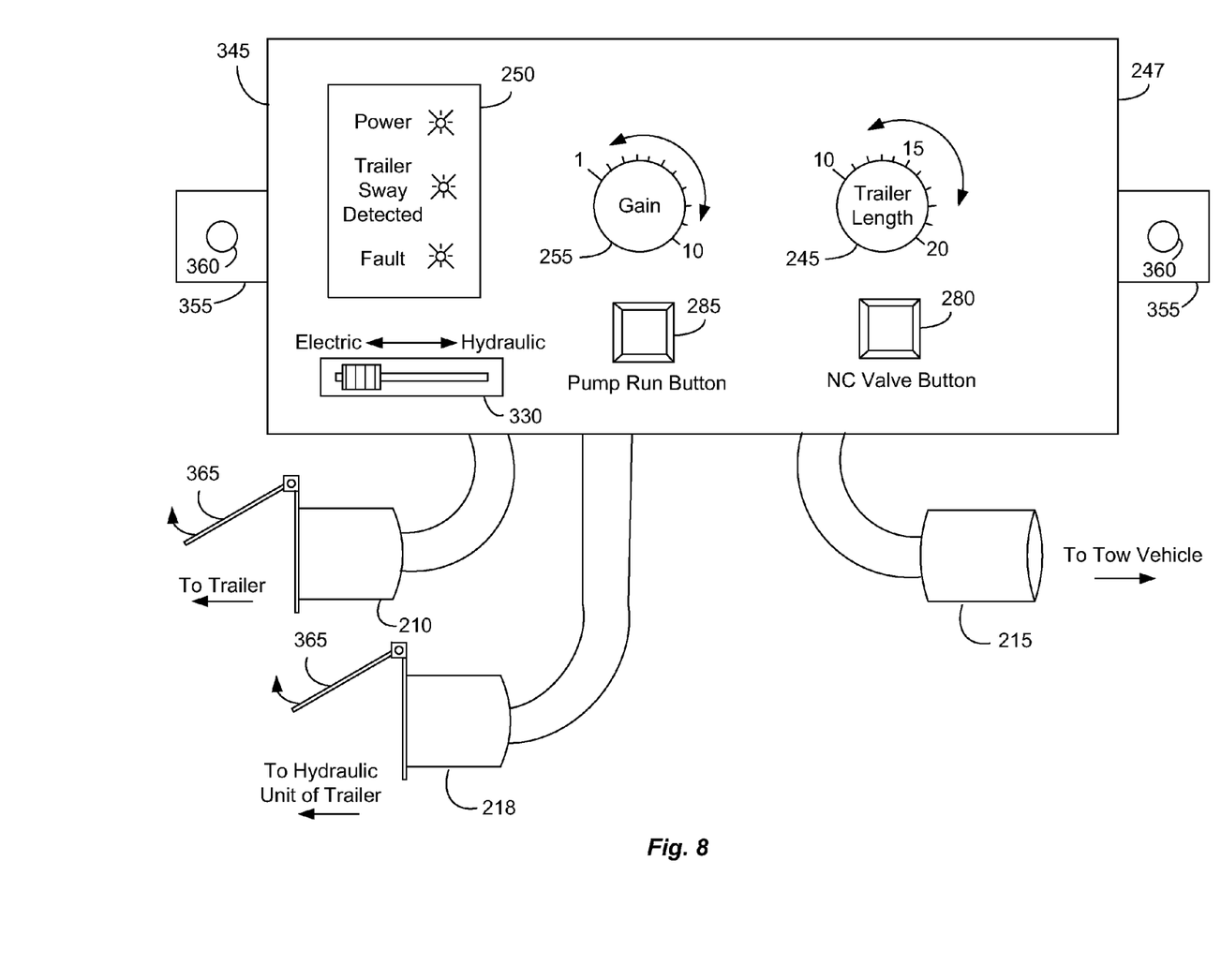
FIG. 8 illustrates a housing of an independent trailer sway controller according to embodiments of the invention.

Similar to the trailer length setting dial 245, the gain setting dial 255 is on the housing 247 of the independent trailer sway controller 120. The rotation of the gain setting dial 255 alters the level of gain applied to signals received and output by the gain setting dial 255. For instance, in some embodiments the gain setting dial 255 is positioned between −5 and +5. The +5 position is intended for use while towing heavy trailer loads where additional braking force is desired. The −5 position is for use while towing of light trailer loads where reduced braking force is desired. In some embodiments, the gain is adjustable between zero and +10 (i.e., the gain setting dial is not operable to reduce the voltage level of a signal received). In other embodiments, the gain is adjustable between +5 and +15 (i.e., at least some increase is always applied to the voltage level of the signal received). In some embodiments, the signal output by the ECU is an encoded digital value supplied directly to the trailer brakes 170 that indicates the level of braking force to apply. In these embodiments, a separate enable/disable brake lights signal is supplied to the brake lights 260.

FIG. 6*a* depicts another embodiment of the independent trailer controller 120*b* for use with a trailer 110 that includes a hydraulic brake system 275. The controller 120*b* similarly receives power at the power supply input 225 from either the trailer battery control line or power and ground lines of the signal lines 220. The power supply input 225 is coupled to the ECU 230*b* and the brake light/control relay 235. Similar to the ECU 230*a*, the ECU 230*b* includes the TSD module 252 and a brake controller module 254*b* and is coupled to a sway sensor 240, a trailer length setting dial 245, a power lamp 250, and the brake light/control relay 235. The sway sensor 240, trailer length setting dial 245, power lamp 250, and TSD module 252 operate as described above in relation to the independent trailer sway controller 120*a* of FIG. 5.

In contrast to the ECU 230*a*, the ECU 230*b* includes a brake controller module 254*b* that is coupled to a hydraulic brake system 275 (see FIG. 6*b*), a normally closed (NC) valve button 280, and a pump run button 285. The brake controller module 254*b* is coupled to and controls the hydraulic brake system 275 via the hydraulic brake controls 221 including a normally closed valve control 290 and a pump control 295.

Figure 6B:
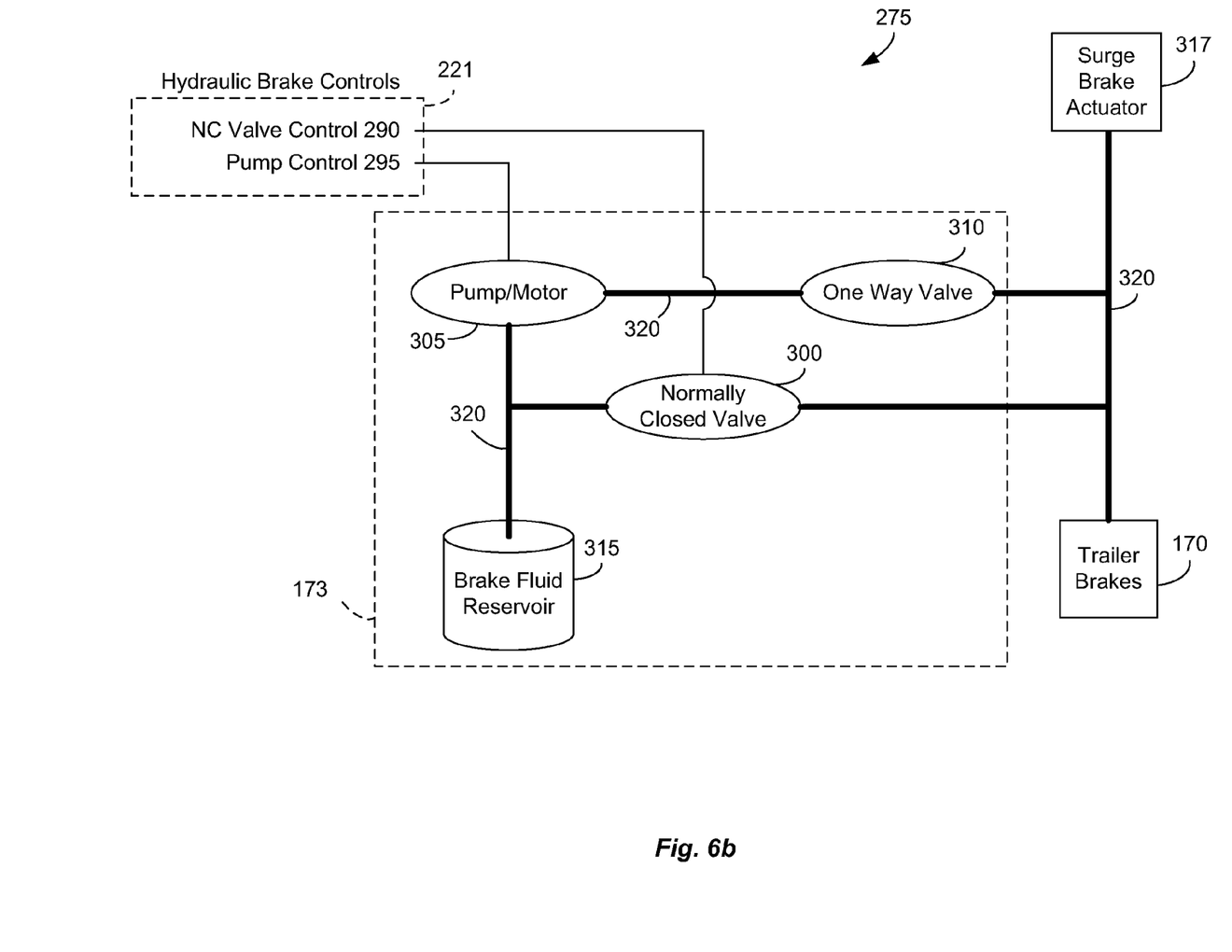
FIG. 6b illustrates a hydraulic braking system for a trailer.

Turning to FIG. 6*b*, the normally closed valve control 290 and the pump control 295 are coupled to a normally closed valve 300 and a pump/motor 305, respectively. The normally closed valve 300, the pump/motor 305, a one way valve 310, a brake fluid reservoir 315, a surge brake actuator 317 (for surge-hydraulic braking systems), and the trailer brakes 170 are interconnected by hydraulic lines 320 (e.g., pipes or tubes) for containing and transmitting hydraulic fluid. The one way valve enables hydraulic fluid to flow from the pump/motor 305 to the trailer brakes 170, but not from the trailer brakes 170 to the pump/motor 305. In response to an enabling control signal along the pump control 295, the pump/motor 305 pumps hydraulic fluid from the brake fluid reservoir 315 through the one way valve 310 to build hydraulic pressure in the hydraulic lines 320 and activate the trailer brakes 170. To release the built-up pressure in the hydraulic lines 320 and deactivate the trailer brakes 170, the normally closed valve 300 is opened by the normally closed valve control 290 and the pump/motor 305 is disabled by the pump control 295.

The surge brake actuator 317 is included in surge-hydraulic braking systems. The surge brake actuator 317 causes an increase in pressure in the hydraulic lines 320 in response to slowing of the tow vehicle 105, which causes the faster-moving trailer 110 to push against the tow vehicle 105. The more force from the trailer 110 to the tow vehicle 105, the more braking pressure in the hydraulic line 320 caused by the surge brake actuator 317. The pressure in the hydraulic lines 320 is released by reducing the forces from the trailer 110 on the tow vehicle 105. For example, increasing the speed of the tow vehicle 105 relative to the trailer 110 will release pressure in the hydraulic lines 320. Thus, surge brake actuator 317 and the hydraulic brake controls 221 are each independently operable to increase pressure in the hydraulic lines 320 to cause braking of the trailer brakes 170.

Returning to FIG. 6a, the brake controller module 254b receives a signal upon activation of the NC valve button 280. In response, the brake controller module 254b sends an open signal to the normally closed valve 300. The NC valve button 280 is usable by an operator to manually clear brake lines of pressure, e.g., for maintenance purposes. Additionally, the brake controller module 254b receives a signal upon activation of the pump run button 285. In response, the brake controller module 254b sends an enable signal to the pump/motor 305. The pump run button 285 is usable by an operator to manually build brake pressure to test the brakes or to clear the hydraulic lines 320 of brake fluid, e.g., for maintenance purposes.

FIG. 7 depicts the independent trailer sway controller 120c. The independent trailer sway controller 120c is operable to be coupled to either a trailer 110 with an electronic brake system (similar to FIG. 5) or a trailer 110 with a hydraulic brake system 275 (similar to FIGS. 6a-b). Thus, the independent trailer sway controller 120c includes both the components of the independent trailer sway controllers 120a and 120b. The independent trailer sway controller 120c operates as the independent trailer sway controller 120a (an electric brake mode) if coupled to a trailer 110 with an electronic braking system and operates as the independent trailer sway controller 120b (in a hydraulic brake mode) if coupled to a trailer 110 with a hydraulic braking system. A mode selector 330 is usable by an operator to select the mode of the independent trailer sway controller 120c.

FIG. 8 depicts the housing 247 for the independent trailer sway controller 120c. The housing includes tabs 355 with through-holes 360 for coupling to the tongue 130 of trailer 110. The housing includes the two receptacles 210 and 218 and plug 215. The operator couples the independent trailer sway controller 120c to the trailer 110 using receptacle 210 and to the tow vehicle 105 using plug 215. If the trailer 110 includes a surge hydraulic braking system, the operator also couples the independent trailer sway controller 120c to the hydraulic braking unit 173 of the trailer 110 using receptacle 218. Additionally, the receptacles 210 and 218 include a lid 365 for preventing dirt, water, etc. from reaching the receptacles 210 and 218. Although not depicted, the plug 215 includes a similar lid in some embodiments.

The independent trailer sway controller 120a includes a housing similar to housing 247, except that the NC valve button 280, pump run button 285 and mode selector 330, and receptacle 218 are not included. The independent trailer sway controller 120b includes a housing similar to housing 247 except that the gain setting dial 255 and mode selector 330 are not included. In some embodiments, the receptacles 210 and 218 are combined into a single receptacle generic across the independent trailer sway controllers 120a, 120b, and 120c.

In some embodiments, an additional offset dial (not shown) is provided on the housing 247. The offset dial is used to indicate to the ECU 230a, 230b, and 230c the distance along the axis 150 between the sway sensor 240 and the z-axis where sway is measured (e.g., the distance between the sway sensor 240 and the center of gravity of the trailer 110 or the intersection of axes 150 and 175).

Figure 9:
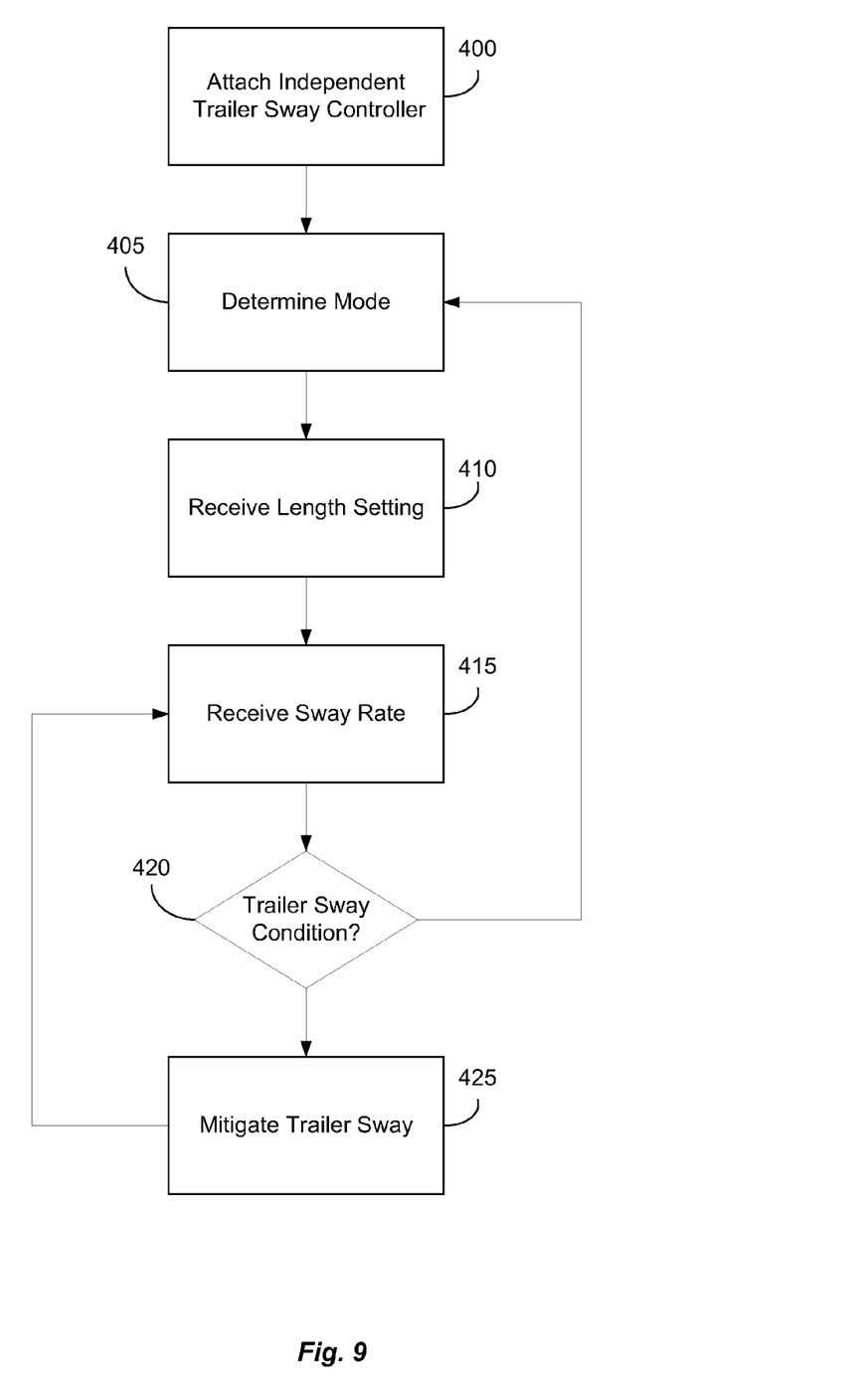
FIG. 9 illustrates a method of mitigating trailer sway using an independent trailer sway controller according to embodiments of the invention.

FIG. 9 depicts a method of controlling trailer sway using an independent trailer sway controller such as independent trailer sway controller 120c. In step 400, the independent trailer sway controller 120c is coupled to the tongue 130 of trailer 110. For instance, the independent trailer sway controller 120c is mounted using nuts and bolts to secure the tabs 355 to the tongue 130. Additionally, the appropriate receptacle(s) (e.g., one or both of the receptacles 210 and 218) are coupled to the trailer 110 and the appropriate plugs (e.g., the plug 215) are coupled to the tow vehicle 105, thereby permitting the transfer of control signals and power signals between the trailer 110, the independent trailer sway controller 120c, and the tow vehicle 105. Furthermore, the power lamp 250 and cabin indicator 251 indicate that power is on and whether the independent trailer sway controller 120c is operating correctly or has a fault.

In step 405, the independent trailer sway controller 120c determines a mode of operation. For the independent trailer sway controller 120c, the ECU 230c determines the mode of operation (e.g., electric or hydraulic brakes) by receiving a mode selection signal from the mode selector 330. After determining the mode, the ECU 230c proceeds to step 410.

In step 410, the ECU 230c receives settings information, such as the trailer length from trailer length setting dial 245. In step 415, the TSD module 252 receives the sway data from the sway sensor 240. In step 420, the TSD module 252 determines whether a trailer sway condition exists using the sway data supplied from the sway sensor 240 and the trailer length setting supplied from the trailer length setting dial 245.

In general, the higher the level of trailer sway (e.g., one or more of the sway oscillation rate, the sway acceleration, and the sway speed), the more likely a trailer sway condition exists. However, different thresholds of each of sway oscillation rate, sway acceleration, and sway speed are used to detect trailer sway condition for a shorter trailer versus a longer trailer. For instance, a longer trailer will have lower thresholds because its increased size creates a dangerous driving situation at lower sway oscillations, sway accelerations, and/or sway speeds than a shorter trailer. Likewise, a shorter trailer will have higher thresholds because its decreased size and different center of gravity location require a higher sway oscillation rate, sway speed, and/or sway acceleration before a dangerous driving situation occurs. By altering the trailer length setting using the trailer length setting dial, the ECU 230 is able to alter the thresholds to more accurately detect trailer sway than, for instance, a trailer sway controller with only default threshold settings used for various trailer sizes.

If no trailer sway condition exists (i.e., the detected trailer sway does not exceed a certain threshold), the ECU 230c returns to step 405. If trailer sway exists (i.e., the detected trailer sway exceeds a certain threshold), the ECU 230c proceeds to step 425 to mitigate the trailer sway. In step 425, if in an electric mode, the brake controller module 254a outputs a brake enable signal to the brake light/control relay 235, which causes activation of the brake lights 260 and trailer brakes 170 as described above. If in a hydraulic brake mode, the brake controller module 254b outputs an enable signal via the pump control 295 to the pump/motor 305 to cause activation of the trailer brakes 170. Additionally, in the hydraulic brake mode, the brake controller module 254a outputs a brake enable signal to the brake light/control relay 235, which causes activation of the brake lights 260.

In some embodiments, the ECU 230c also causes a visual indication of a trailer sway condition to the driver cab (e.g., via a signal sent along the other line of the signal lines 220), to the power lamp 250, or both. In some embodiments, the trailer sway condition is indicated by transmitting a control over wire or wirelessly to the cabin indicator 251 to cause illumination of a light emitting diode (LED). The ECU 230c returns to step 415 for the TSD module 252 to receive the updated sway data and proceeds to step 420 for the TSD module 252 to determine if the trailer sway condition persists. The ECU 230c continues to mitigate the trailer sway (via the actions taken in step 425) until, in step 420, the ECU 230c determines no trailer sway condition exists.

Step 405 is not necessary for the independent trailer sway controllers 120a and 120b, as they each have a single mode that is not selectable. Rather, the ECU 230a and ECU 230b proceed from step 400 to step 410, bypassing step 405. For ECU 230a, the remainder of the method of FIG. 9 (i.e., steps 410, 415, 420, and 425) is performed by the ECU 230a as the ECU 230c performs them in the electric mode. Similarly, for ECU 230b, the remainder of the method 400 (i.e., steps 410, 415, 420, and 425) is performed by the ECU 230b as the ECU 230c performs them in the hydraulic mode.

Figure 10:
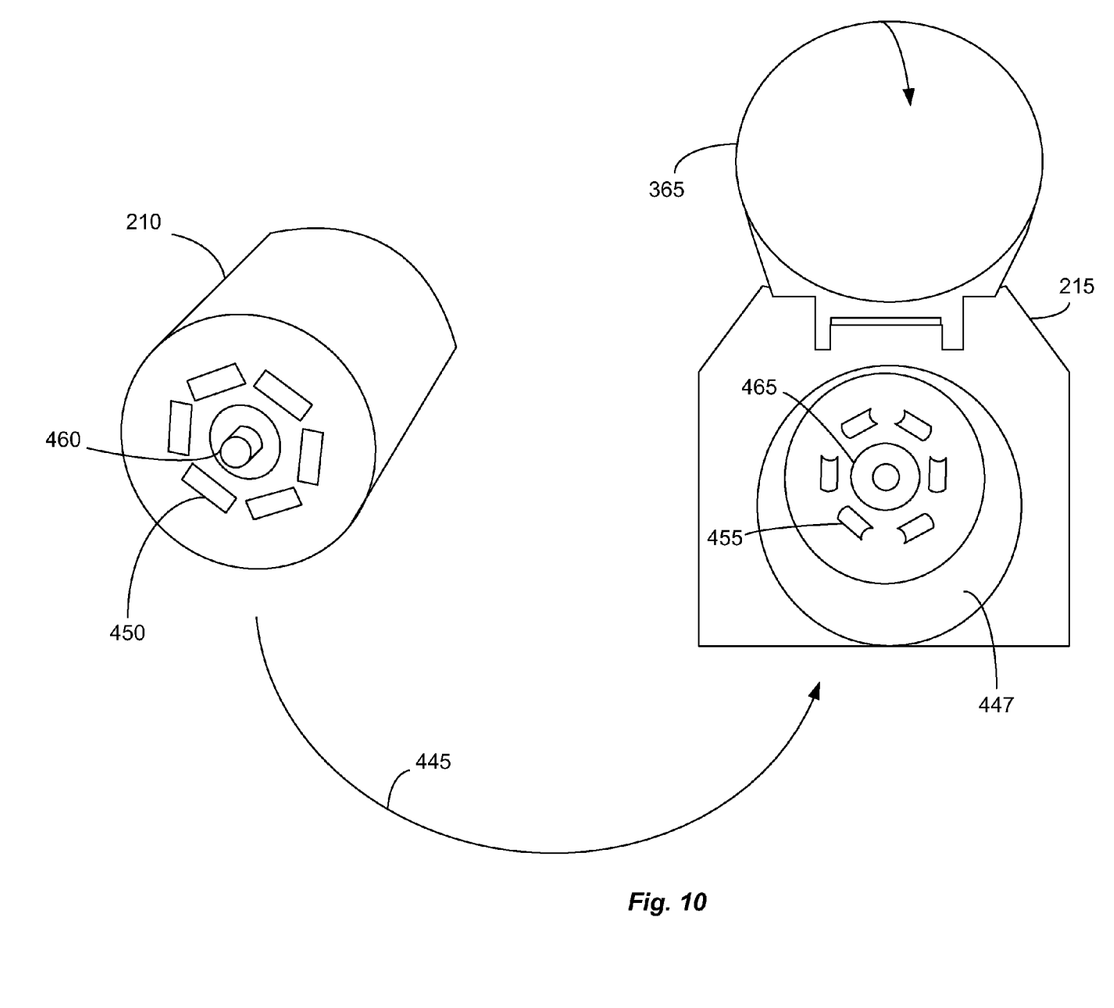
FIG. 10 illustrates a 7-pin trailer plug and receptacle.

FIG. 10 illustrates the receptacle 210 and plug 215 as 7-pin trailer connectors. The receptacle 210 is cylindrical and inserted along line 445 into a cylindrical receiver 447 of plug 215. The receptacle 210 is a male connector with six female pin receivers (e.g., pin receiving 450). The plug 215 is a female connector with six male pins (e.g., pin 455). The receptacle 210 also includes a single pin 460 to be received by the receiver 465. The plug 215 also includes the lid 365.

Thus, the invention provides, among other things, an independent trailer sway controller for mitigating trailer sway. The independent trailer sway controller is modular and, thus, swappable between trailers. The independent trailer sway controller also includes a length dial to indicate the length of the trailer to which the controller is mounted. The length dial enables a more accurate determination of the center of gravity of the trailer and, in turn, whether a trailer sway condition exists that is to be mitigated. The independent trailer sway controller also includes a gain dial to adjust the braking force used to mitigate trailer sway. The gain dial is increased for heavier trailer loads and decreased for lighter trailer loads. Additionally, the independent trailer sway controller is operable with multiple braking systems, including an electric braking system and a hydraulic braking system. In some embodiments, a hydraulic unit (e.g., similar to that shown in FIG. 6b) is added to a hydraulic trailer to enable the independent trailer sway controller to control the hydraulic brakes. Various features and advantages of the invention are set forth in the following claims.

What is claimed is:

1. An independent trailer sway controller configured to be mounted on a trailer, the independent trailer sway controller comprising:
   a first electrical connector operable to selectively couple the independent trailer sway controller to an electrically-actuated frictional trailer braking system;
   a second electrical connector operable to selectively couple the independent trailer sway controller to a hydraulically-actuated frictional trailer braking system;
   trailer length input operable to receive length data indicating a length of the trailer and output the length data;
   a sway sensor operable to sense sway of the trailer and output sway data;
   a trailer sway detector module operable to receive the length data and the sway data, determine a level of trailer sway based on the length data and the sway data, determine whether the level of trailer sway exceeds a predetermined threshold, and output a trailer sway condition signal if the level of trailer sway exceeds the predetermined threshold; and
   a brake controller module operable to receive the trailer sway condition signal and, in response, output a brake enable signal over at least one of the first electrical connector and the second electrical connector to be received by a trailer braking unit to enable a trailer brake to apply braking force to one or more trailer wheels to mitigate trailer sway.

2. The independent trailer sway controller of claim 1, further comprising a gain input device for receiving a gain amount from an operator, the gain amount adjusting the braking force applied to mitigate trailer sway.

3. The independent trailer sway controller of claim 1, wherein the brake enable signal is a pump control signal that causes a hydraulic pump of the trailer to pressurize hydraulic lines and, thereby, enable the trailer brake.

4. The independent trailer sway controller of claim 3, wherein the brake controller module further includes a valve control output coupled to a pressure release valve of the hydraulic lines that, when controlled to open by the brake controller module, releases hydraulic fluid to disable the trailer brake.

5. The independent trailer sway controller of claim 1 further comprising: a two vehicle connector operable to selectively couple the independent trailer sway controller to a tow vehicle.

6. The independent trailer sway controller of claim 1 further comprising a mode selector including at least an electric brake position and a hydraulic brake position, the electric brake position indicating to the independent trailer sway controller that the trailer brake is an electric brake and the hydraulic brake position indicating to the independent trailer sway controller that the trailer brake is a hydraulic brake.

7. The independent trailer sway controller of claim 1 further comprising a housing, wherein the trailer length input is coupled to an outside surface of the housing to receive input from an operator of the independent trailer sway controller.

8. The independent trailer sway controller of claim 1 further comprising a housing including at least one of a pump run input device and a normally closed valve input device, wherein activation of the pump run input device causes a hydraulic pump to pump hydraulic fluid through hydraulic lines to one of pressurize the hydraulic lines and bleed the hydraulic lines, and wherein activation of the normally closed valve input device causes a normally closed valve to open to allow depressurization of hydraulic lines.

9. A method of mitigating sway of a trailer with an independent trailer sway controller configured to be mounted on a trailer, the method comprising:
receiving length data indicating a length of the trailer from a trailer length input on the independent trailer sway controller;
receiving sway data output from a sway sensor indicating sway rate of the trailer;
determining a level of trailer sway based on the length data and the sway data;
determining whether the level of trailer sway exceeds a predetermined threshold;
generating and outputting braking control signals over one of a first electrical connector coupling the independent trailer sway controller to an electrically-actuated frictional trailer braking system and a second electrical connector coupling the independent trailer sway controller to a hydraulically-actuated frictional trailer braking system if the level of trailer sway exceeds the predetermined threshold, wherein outputting the braking control signals causes a brake of the trailer to apply braking force, thereby mitigating sway of the trailer.

10. The method of claim 9, further comprising: attaching the independent trailer sway controller to the trailer; electrically coupling the independent trailer sway controller to the trailer through at least one of the first electrical connector and the second electrical connector; and electrically coupling the independent trailer sway controller to a tow vehicle.

11. The method of claim 10, further comprising: detaching the independent trailer sway controller from the trailer and decoupling the independent trailer sway controller from the trailer and the tow vehicle; attaching the independent trailer sway controller to a second trailer; electrically coupling the independent trailer sway controller to the second trailer through at least one of the first and second electrical connectors; and electrically coupling the independent trailer sway controller to a second tow vehicle, wherein the trailer includes a different type of braking system than the second trailer.

12. The method of claim 9, further comprising determining a mode of the independent trailer sway controller, wherein the mode is one of an electric brake mode and a hydraulic brake mode.

13. The method of claim 9, further comprising: receiving a gain amount from an operator using a gain input device; and adjusting the braking force applied to mitigate trailer sway using the received gain amount.

14. The method of claim 9, wherein the braking control signals include a pump control signal output to a hydraulic pump of the trailer that pressurizes hydraulic lines and, thereby, enables the brake.

15. The method of claim 14, further comprising disabling trailer brakes after mitigation of trailer sway by outputting a valve control signal to open a pressure release valve of the hydraulic lines.

16. The method of claim 9, wherein the trailer length input is coupled to an outside surface of a housing of the independent trailer sway controller.

17. The method of claim 9, further comprising illuminating a lamp to indicate that a trailer sway condition exists and illuminating a brake light to indicate enabling of the brake.

18. The method of claim 9, further comprising receiving a pump run control signal from a pump run button on a housing of the independent trailer sway controller; and in response, causing a hydraulic pump to pump hydraulic fluid through hydraulic lines to one of pressurize the hydraulic lines and bleed the hydraulic lines.

19. The method of claim 9, further comprising receiving a valve open control signal from a normally closed valve button on a housing of the independent trailer sway controller; and in response, causing a normally closed valve to open to allow depressurization of hydraulic lines.

* * * * *